(12) United States Patent
Wolf et al.

(10) Patent No.: US 7,146,788 B2
(45) Date of Patent: Dec. 12, 2006

(54) CHOPPER ARRANGEMENT FOR A FORAGE HARVESTER

(75) Inventors: Helmut Wolf, Zweibrücken (DE); Marc Kirsch, Epping (FR)

(73) Assignee: Deere & Company, Moline, IL (US)

( * ) Notice: Subject to any disclaimer, the term of this patent is extended or adjusted under 35 U.S.C. 154(b) by 275 days.

(21) Appl. No.: 10/910,717

(22) Filed: Aug. 3, 2004

(65) Prior Publication Data

US 2005/0076631 A1    Apr. 14, 2005

(30) Foreign Application Priority Data

Oct. 4, 2003   (DE) ................ 103 46 116

(51) Int. Cl.
*A01D 82/00* (2006.01)
(52) U.S. Cl. .................... 56/16.4 R; 56/504
(58) Field of Classification Search ............ 56/500, 56/16.4 R, 1, 504
See application file for complete search history.

(56) References Cited

U.S. PATENT DOCUMENTS 3,331,167 A  *  7/1967 Hoch ............... 451/419
4,321,773 A  *  3/1982 Fleming ............ 451/421
4,503,643 A      3/1985 Johnson et al.
5,209,025 A      5/1993 Martin et al.
6,430,909 B1 *  8/2002 Clauss ............... 56/250
2005/0072135 A1 * 4/2005 Kormann ............ 56/500

FOREIGN PATENT DOCUMENTS

| DE | 35 28 538 | 8/1985 |
| DE | 41 34 957 | 10/1991 |
| DE | 199 10 757 | 3/1999 |
| DE | 102 35 919 | 7/2002 |
| EP | 0 444 916 | 2/1991 |

\* cited by examiner

*Primary Examiner*—Meredith C. Petravick

(57) ABSTRACT

A forage harvester chopper arrangement is located within a housing provided with an access door mounted for pivoting vertically between a chopping position, wherein access to the chopping arrangement is prevented, and a grinding position, permitting access to the chopping arrangement by a grinding arrangement. A locking arrangement is associated with the access door and an actuator is coupled to the access door and the locking arrangement by a linkage containing lost-motion means which operates such that when moving the access door to its grinding position, the locking arrangement is moved to its unlocked position prior to the access door being raised to its grinding position, and such that when returning the access door to its chopping position, the access door is closed before the locking arrangement is moved to its locked position.

10 Claims, 4 Drawing Sheets

CHOPPER ARRANGEMENT FOR A FORAGE HARVESTER

FIELD OF THE INVENTION

The invention concerns a chopper arrangement for a forage harvester with a guide arrangement and a access door arranged on a housing at the chopper arrangement, that can be moved by means of an actuator actuated by external forces between a chopping position, in which it closes the housing, and a grinding position, in which it partially opens the housing, so that the grinding arrangement can interact with the chopper arrangement.

BACKGROUND OF THE INVENTION

In forage harvesters, it is useful to sharpen the knives of the chopper arrangement from time to time in order to assure that the knives are sufficiently sharp. In this way, the energy requirement for the chopping are kept low and the quality of the cut is kept high. The chopper arrangement is enclosed by a housing that is provided with openings for the supply and delivery of the harvested crop, but its otherwise closed, in order to prevent a discharge of the harvested crop at undesired locations and a contact of the chopper arrangement with the operator. In order to permit the grinding arrangement to interact with the chopper arrangement, the state of the art provides a access door that can be moved between a chopping position, in which it closes the housing in order to prevent an undesired access to the chopper arrangement, and a grinding position, in which it permits access to an opening in the housing, through which the chopper arrangement can interact with the grinding arrangement. In this position, a visual inspection of the knives and a possible replacement of the knives can also be performed.

The movement of the access door between the aforementioned positions can be performed by an actuator actuated by external forces, particularly an electric linear motor (DE 41 34 957 A) or a rotating electric motor (EP 0 444 916 A) that is connected so as to drive the access door over a drive mechanism. The position of the access door is detected by sensors, particularly limit switches or linear potentiometers, and the actuator is controlled to correspond. Thereby the access door is retained exclusively in the chopping position by the actuator.

In certain operating conditions, particularly if the harvested crop is not delivered properly at the outlet of the chopper arrangement and re-circulates with it or jams the chopper arrangement, relatively intense forces can be applied to the cover arrangement, that can also act in form of impulses or beats, and can be transmitted over the drive mechanism to the actuator and the sensor of the position detection arrangement of the cover arrangement. These forces can lead to damage of the actuator or the sensor.

The problem underlying the invention is seen in the need to overcome the aforementioned problem.

SUMMARY OF THE INVENTION

According to the present invention, there is provided an improved access door control arrangement for a chopper arrangement of a forage harvester.

An object of the invention is to provide such an access door control arrangement which includes a locking arrangement for securing the door in its chopping position.

This object is achieved by mounting the access door to the chopper housing by a locking arrangement which may be released from a locked position. The locking arrangement fixes the position of the door independently of any possible retaining force of the actuator, actuated by external forces. In this way, the result is that any possible forces acting on the door, that can be caused particularly by harvested crop jamming itself up, can be deflected by the locking arrangement and not transmitted to the actuator and, if necessary, to the sensor for the detection of the position of the access door or transmitted only to a lesser degree. Thereby damage to these elements need not be feared.

One solution is to use the actuator, actuated by external forces, that moves the access door also for the retaining and releasing of the locking arrangement. This is performed to great advantage, in which the actuator at first brings the locking arrangement into the release position for the opening of the access door and in a time sequence, subsequently moves the access door into the grinding position. Analogously, the access door is first moved into the chopping position and then the locking arrangement is secured.

In order to attain this operating procedure, a solution is to provide a connection between the actuator and the cover arrangement, that permits a certain lost-motion. If the actuator moves within this lost-motion, then it opens or closes the locking arrangement. Upon overcoming the lost-motion, the access door is moved. This can be attained by any desired mechanical device, for example, by an elongated hole that is engaged by a pin or by a cam that interacts with an opposing element. The drive arrangement between the actuator and the locking arrangement can be rigid or buffered by a spring.

In a preferred embodiment of the invention, the locking arrangement includes a locking bar element that moves in a linear direction in a corresponding guide ion order to avoid tilting. In the locking position, the locking bar element engages an associated opening. Here it does not matter whether the locking bar element is attached to the access door and engages an opening in the housing or inversely is attached to the housing and engages an opening in the cover arrangement. In another embodiment, the locking bar element performs a rotating movement.

Finally, the actuator, actuated by external forces, is connected with the access door and the locking arrangement preferably over a shaft. The actuator may be a linear motor that preferably drives the shaft by means of gears. The shaft pivots or rotates the access door between the chopping position and the grinding position and also moves the locking arrangement in a linear motion or in a rotary motion. In another embodiment, the actuator moves the access door in a linear direction.

BRIEF DESCRIPTION OF THE DRAWINGS

The drawings shown an embodiment of the invention that shall be described in greater detail I the following.

DESCRIPTION OF THE PREFERRED EMBODIMENT

Figure 1:
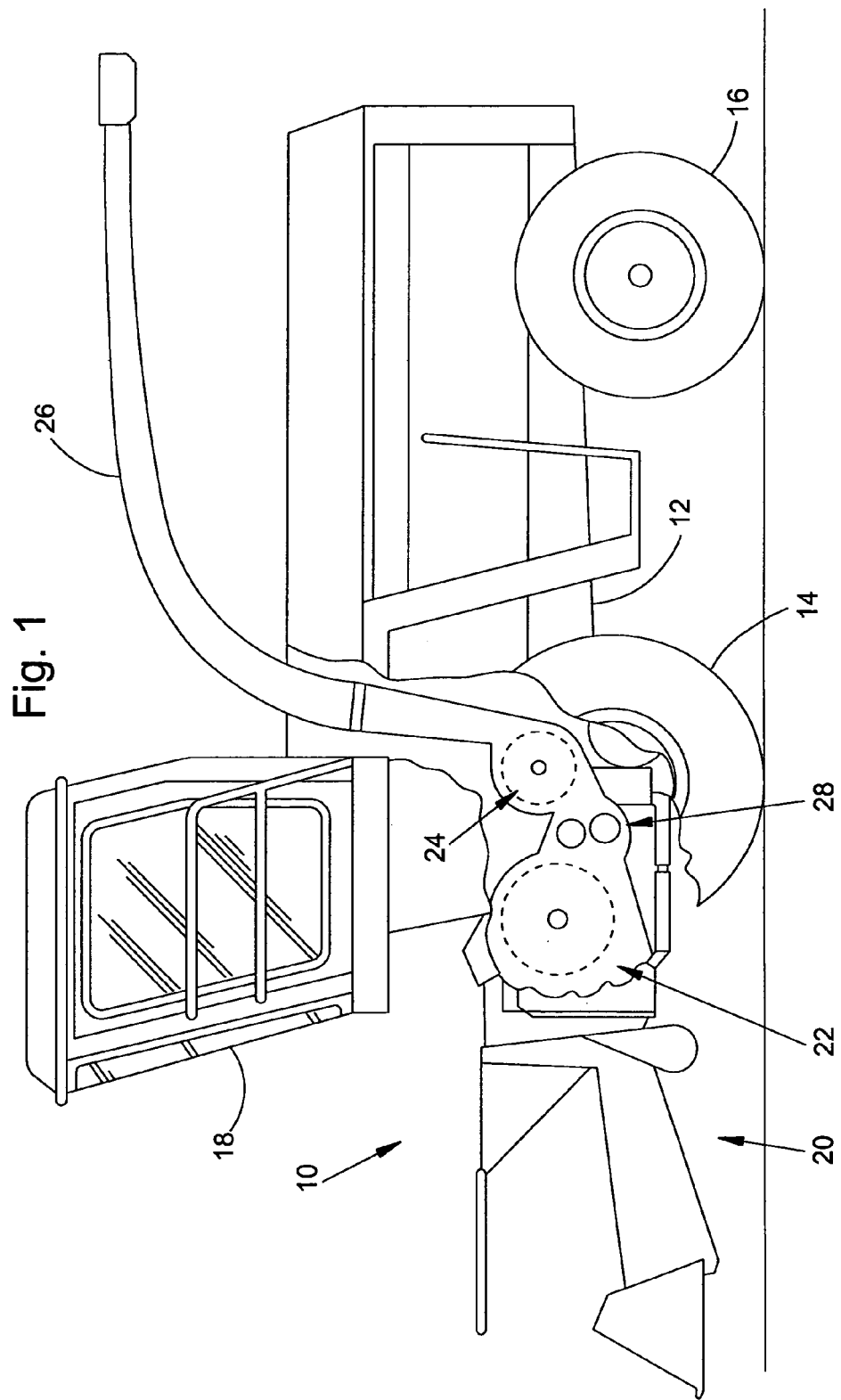
FIG. 1 is a schematic left side view of a forage harvester including a chopper arrangement.

A self-propelled harvester 10, shown in FIG. 1, includes a frame 12 supported on front driven wheels 14 and rear steerable wheels 16. The forage harvester 10 is controlled from an operator's cab 18 from which a harvested crop recovery arrangement 20 can be viewed. Crop, for example, corn, grass or the like, taken up from the ground by the crop recovery arrangement 20 is conducted to a chopper arrangement 2 in the form of a chopper drum, that chops the crop into small pieces and delivers these pieces to a conveyor arrangement 24. The crop leaves the harvesting machine 10 to an accompanying trailer through a discharge duct 26 that can be rotated about a vertical axis and which may be repositioned in height. A post chopper reduction arrangement or kernel processor 28, that can be removed if desired, is arranged between the copper arrangement 2 and the conveyor arrangement 24, through which the crop to be conveyed is conducted tangentially to the conveyor arrangement 24. The invention could also be applied to a towed or an attached forage harvester.

Figure 2:
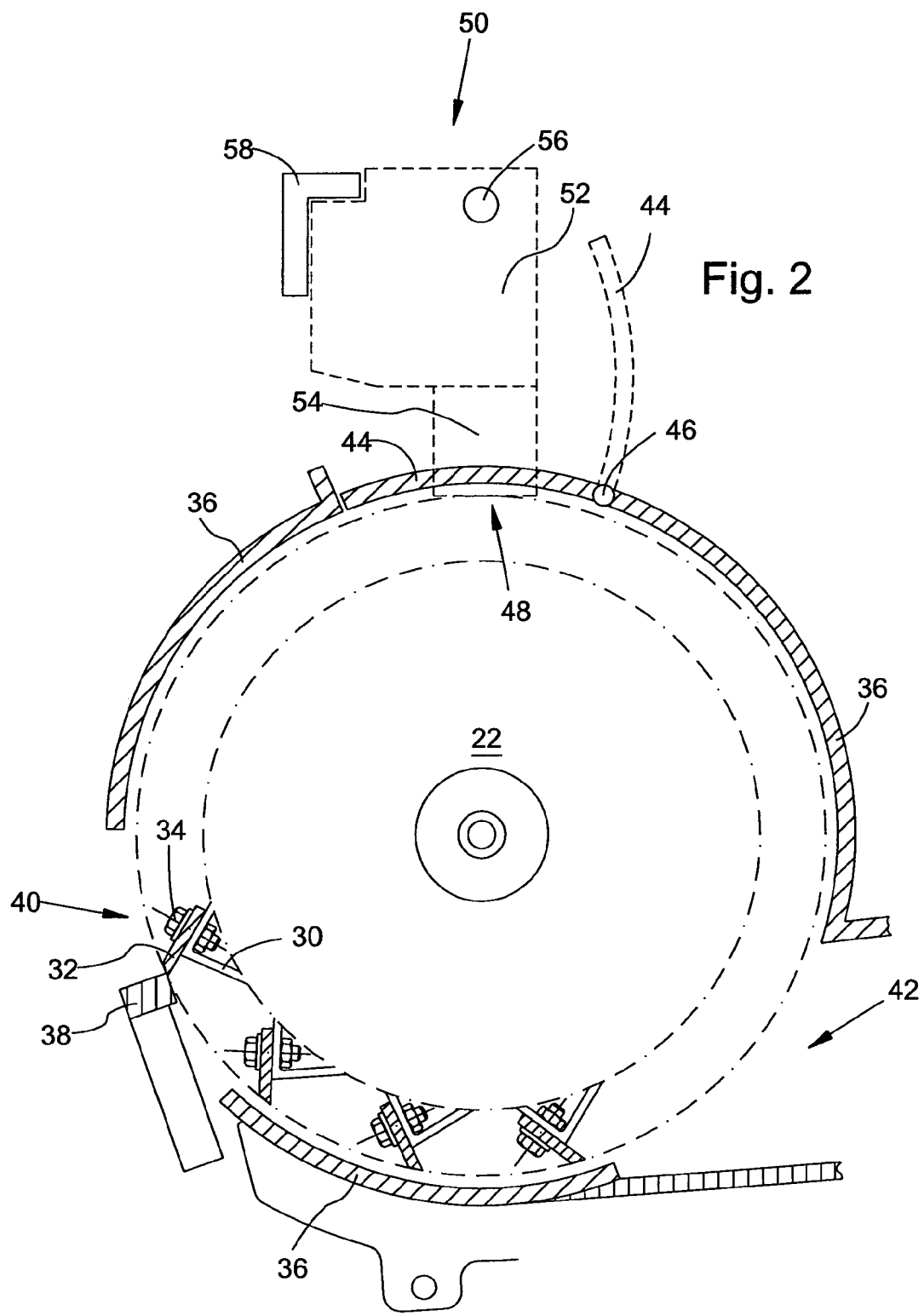
FIG. 2 is a vertical cross section through the chopper arrangement, with the guide arrangement and the access door arranged on its upper side.

FIG. 2 shows the attachment of the chopper arrangement 22 about whose circumference knife holders 30 are distributed with knives 32, fastened by screws 34, in a drum-shaped housing 36 that is approximately coaxial with the axis of rotation of the chopper arrangement 22. A shear bar 38 is arranged at an inlet opening 40 of the housing 36 to which harvested crop is supplied by the harvested crop recovery arrangement 20. The knives 32 cut the harvested crop in interaction with the shear bar 38. Then the harvested crop reaches the post chopper reduction arrangement 28 through an outlet opening 42 of the housing 36 or, in case that the post chopper reduction arrangement has been removed, it reaches the conveyor arrangement 24 directly.

An access door 44 is located on the upper side of the housing 36 that can be pivoted between a chopping position, shown in solid lines, and a grinding position, shown in dashed lines, supported in bearings about an axis 46 extending parallel to the axis of rotation of the chopper arrangement 22. The access door 44 encloses the housing 36 in the upward direction, so that no harvested crop can exit there and unintended contact with the knives 32 by an operator should not be feared. In the grinding position, the access door is pivoted upward and opens an opening 48 on the upper side of the chopper arrangement 22.

The knives 32 of the chopper arrangement 22 can be examined visually by an operator through the opening 48. Moreover, a grinding arrangement 50 can operate upon the knives 32 through the opening 48 when the access door 44 is in the grinding position, the grinding arrangement consisting of a carriage 52 with a grinding stone 54 arranged on its underside as well as guide elements 56, 58. In its rest position, the carriage 52 is located to the side alongside the chopper arrangement 22, so that then pivoting of the access door 44 becomes possible without the danger of a collision with the grinding arrangement 50. During the grinding, the carriage 52 with the grinding stone 54 is guided through means of the guide elements 56, 58, that extend parallel to the direction of rotation of the chopper arrangement 22, along the width of the rotating chopper arrangement 22, and preferably in the opposite direction to the direction of rotation use in the harvesting operation, that is shown in FIG. 2 extending in a counterclockwise direction, it is guided along the rotating chopper arrangement 22, in order to sharpen the knives 32. The grinding process can be initiated by the operator or an appropriate sensor arrangement, that detects dull knives 32 (see DE 102 35 919 A and references cited therein). The details of the grinding arrangement 50 are disclosed by DE 199 10 757 A, whose disclosure is incorporated into the present application by reference.

Figure 3:
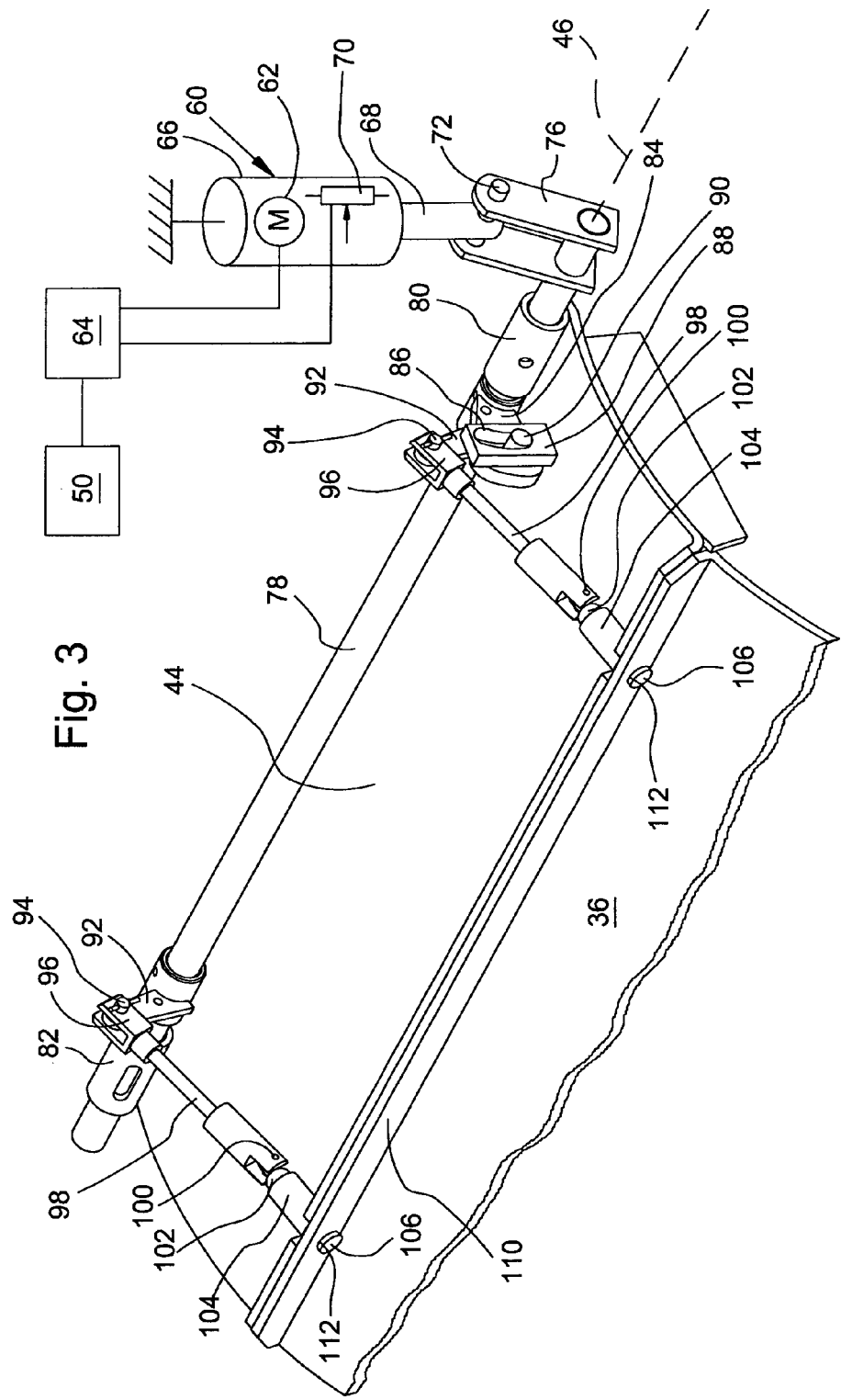
FIG. 3 is a schematic left front perspective view of the access door in the chopping position.

It can be seen that the access door 44 must be brought into the grinding position before the grinding process, and it must be brought back into the chopping position for the resumption of the harvesting operation. The movement of the access door 44 is performed by means of an actuator 60, actuated by external forces, and a mechanism, that is shown in FIG. 3. Thereby the grinding process can be initiated automatically or by the operator in the operator's cab 18 and be performed automatically without any need for the operator to leave the operator's cab 18. Thereby, an electronic control arrangement 64, shown schematically, controls the grinding arrangement 50 and also controls the actuator 60, actuated by external forces, of the access door 44 in order to bring it into the grinding position before the grinding process and subsequently to bring it into the chopping position.

The actuator 60 is a linear motor, known in itself, that contains an electric motor 62, whose rotary movement is converted into linear movement by appropriate elements, such as a rack that interacts with a gear driven by the electric motor 62. The electric motor 62 is arranged in a housing 66 that is located to the side alongside the access door 44 with respect to the direction of operation of the forage harvester 10, and the housing extends vertically. On its upper side, the housing 66 is connected directly or indirectly to the frame 12 of the forage harvester 10. A drive rod 68 is located on the underside of the housing 66 and it can be moved in the vertical direction by the electric motor 62. A sensor 70 is located in the housing 66, or outside of it, and takes the form of a rotary or linear potentiometer that is arranged to detect the actual position of the drive rod 68. The electric motor 62 and the sensor 70 are connected with the electronic control arrangement 64 which also controls the grinding arrangement 50, as is shown schematically in FIG. 3. In place of an actuator 60 operating on a linear basis, a rotary actuator could also be used. In place of an electric drive, a pneumatic or hydraulic drive could also be used for the actuator 60.

A lower region of the drive rod 68 is connected in a joint to a pivot lever 76 over a horizontal, transverse coupling pin 72. The pivot lever 76 is fastened to a shaft 78 which extends parallel to the axis of rotation of the chopper arrangement 22. The shaft 78 is supported in bearings at both ends, not shown, free to rotate, on the frame 12 about its longitudinal axis, which corresponds to the axis 46. The elongated hole 74 and the coupling pin 72 permit a conversion of the linear movement of the drive rod 68 into a pivoting movement of the shaft 78. For this purpose, any other desired devices could be used, such as a joint.

Figure 4:
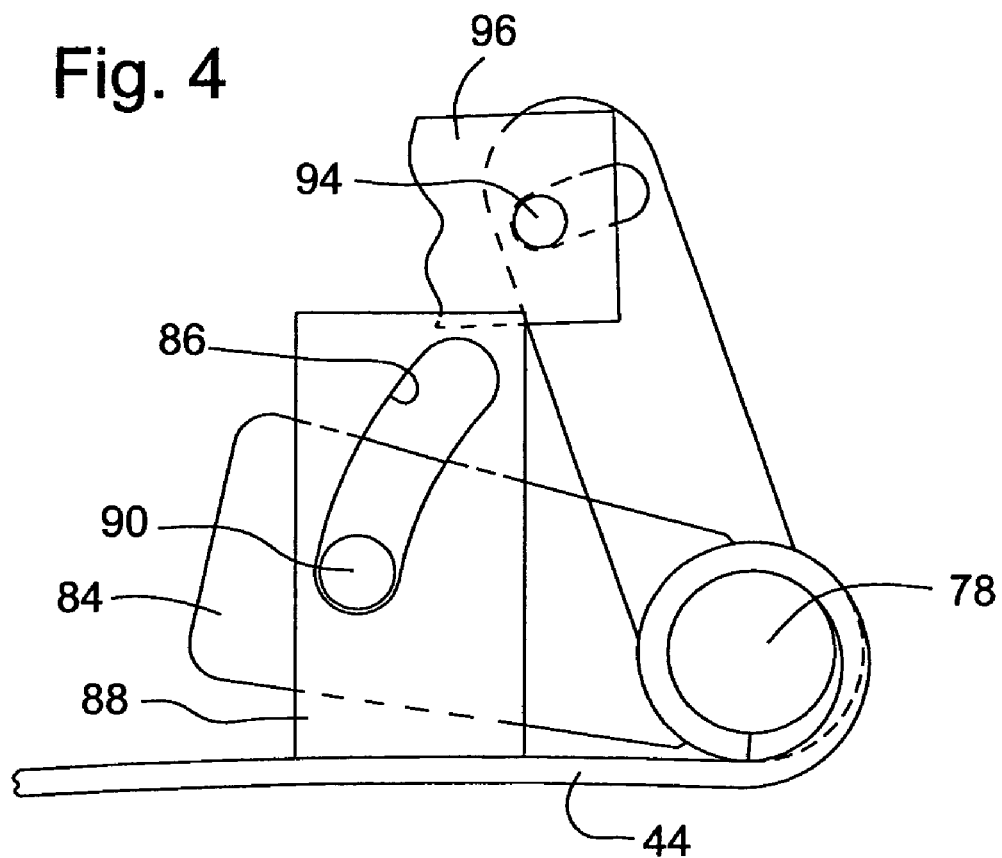
FIG. 4 is a side view of the shaft and the access door with the lost motion means that makes it possible for the actuator to first unlock the locking arrangement before raising the access door to its grinding position, and to first lower the access door to its chopping position before moving the locking arrangement to its locked position.

Furthermore, a rear side of the access door 44 is formed to define a pair of laterally spaced sleeves 80 and 82 received on the shaft 78 for free pivotal movement, whereby the access door 44 is mounted for pivoting vertically about the axis 46. As shown in FIG. 4, the drive connection between the shaft 78 and the access door 44 is performed by an elongated hole connection, that provides an initial rotational lost-motion, in which the access door 44 is not yet moved. This lost-motion connection is composed of a lever 84 applied to the upper side of the shaft 78, an upstanding bracket 88 joined to an upper surface of the door 44 at a location beside the lever 84, with the bracket 88 containing an elongate hole 86 that extends vertically at a radius about the axis 46, and a coupling pin 90 extending parallel to the axis 46, which is carried by the lever 84 and is received within the elongated hole 86.

Figure 5:
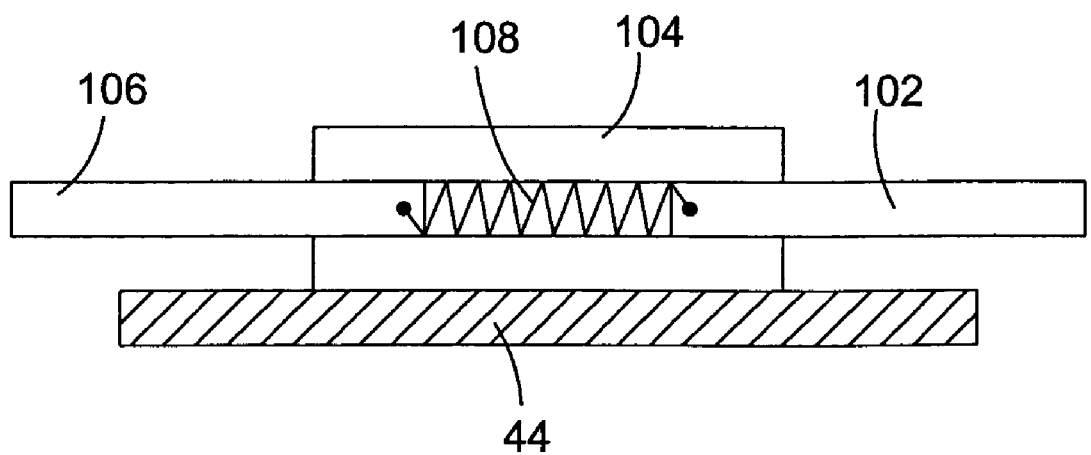
FIG. 5 is a cross section through the guide of the locking bar element of the locking arrangement.

Moreover, two levers 92 are fastened to the shaft 78 and are provided with openings at their outer ends through which coupling pins 94 extend which are attached to forks 96 and which extend parallel to the axis 96. These openings are configured as elongated holes. The forks 96 are attached to rods 98 that extend forward and approximately in the horizontal direction. The rods 98 are connected with two rods 102 over joints 100. The joints 100 can move about axes extending parallel to the axis 46. The second rods 102 also extend forward and approximately in the horizontal direction. In the embodiment shown, the rods 98 can be adjusted in their length. But this characteristic is not an absolute requirement, and non-adjustable rods could also be used. The second rods 102 extend into cylindrical guides 104 that are fastened to the access door 44, in whose opposite ends cylindrical locking bar elements 106 are supported in bearings which are coaxial to the guides 104 and the second rods 102. As can be seen in FIG. 5, a preloaded helical spring 108 is arranged within each of the guides 104 and coupled between adjacent ends of the second rods 102 and the locking bar elements 106, both of which are supported in bearings, free to slide. The springs endeavor to press the locking bar elements 106 away from the second rods 102 and to transmit rearward or forward movement of the second rods 102 to the locking bar elements 106.

On the rear side of the part of the housing 36 that is located immediately in front of the access door 44 in the direction of operation, an angled border 110 is provided. Two cylindrical openings 112 are provided in the border, that extend coaxially to the locking bar elements 106.

Thus, it will be appreciated that the actuator 60 is coupled to the access door 44 and the locking bar elements 106 by a linkage including the shaft 78, the lever 76 coupled between the actuator 60 and the shaft 78, the lever 84 coupled between the shaft 78 and the access door 44, the levers 92 coupled between the shaft 78 and the first rods 98, and the second rods 102 connected between the first rods 98 and the compression springs 108, which are in turn, coupled to the locking bar elements 106.

The following description of the method of operation begins with the fact that the actuator 60, actuated by external forces, is located at first in its upper end position. Then the shaft 78 and the levers 84, 92 coupled to it are located in the position shown in FIG. 3. The locking bar elements 106 penetrate the openings 112 in the border 110 of the part of the housing 36 ahead of the access door 44. Thereby the access door is located in the chopping position and is locked by the locking bar elements 106 at the housing 36. In case that harvested crop is unintentionally carried along around the chopper arrangement 22 or even jams it, so that relatively high radial and/or tangential forces are applied to the access door 44, these forces are deflected by the locking bar elements 106 to the housing 36 and are not absorbed by the actuator 60 or only absorbed to a reduced degree. Damage to the actuator 60 or the sensor 70 is therefore not to be feared.

If the control arrangement 64 initiates a grinding process automatically or upon an operator input, the actuator 60 is activated. It moves the drive rod 68 downward, whose movement is transmitted over the coupling pin 72 to the pivot lever 76. The latter performs a rotation of the shaft 78, that is shown in FIG. 3 as a clockwise movement. In view of the positions of the lever 84, the elongate hole 86 and the coupling pin 90, at first there is no movement that is transmitted to the bracket 88 and to the access door 44, but only a movement of the coupling pin 90 relative to the elongate hole 86. Thereby the access door 44 is not yet being raised.

On the other hand, the elongate openings in the levers 92 are so disposed relative to the coupling pins 94 that the rotation of the shaft 78 is immediately converted into a linear movement over the second levers 92, the coupling pins 94 and the forks 96, which is transmitted to the locking bar elements 106 over the first rods 98, the joints 100, the second rods 102 and the springs 108. Thereby the locking bar elements 106 are moved to the rear, opposite to the direction of operation and withdrawn from the openings 112. Thereby the locking arrangement formed by the elements cited in this section is released and the access door 44 is no longer locked to the part of the housing 36 located in front of it.

The positions of the lever 84, the elongate hole 86 and the coupling pin 90 are selected in such a way that a transmission of the rotational movement of the shaft 78 to the bracket 88 and the access door 44 is performed only slightly after the locking of the locking bar elements 106 have been released from the openings 112. Following this, the access door 44 is rotated upward against the force of gravity and to the rear into the grinding position. During this process, the position of the drive rod 68 is detected by the sensor 70 and continuously monitored by the control arrangement 64. The latter causes the actuator 60 to be de-energized as soon as the access door 44 has reached the grinding position.

Now the grinding process or an inspection of the knives 32 by the operator can take place. Since the access door 44 is now in a definite position at a distance from the grinding arrangement 50, there is the possibility of arranging sealing elements, not shown, at the extreme front face of the access door 44, which are affected relatively little by the sparks generated during the grinding process. This makes possible an improved sealing about the access door 44 of the housing 36 when in the chopping position.

After the conclusion of the grinding process and the other operations, the access door 44 is again brought into the chopping position under the control of the control arrangement 64. For this purpose, the actuator 60 is induced to raise the drive rod 68. Then the shaft 78, in FIG. 3, rotates in the counterclockwise direction. The access door 44 sinks downward and to the front under the force of gravity and/or the effect of the lever 84 on the coupling pin 90, and finally reaches the chopping position. The elongate holes in the second levers 92, which engage the coupling pins 94, is dimensioned in such a way that the locking bar elements 106 extend to the front over the order of the access door 44 only when the chopping position has been reached, since the locking bar elements 06 could not previously enter into the openings 12. The springs 108 prevent elements of the locking arrangement from being damaged when the openings 112 and the locking bar elements 106 are not aligned with each other for any reason whatever. But it would also be conceivable to omit the springs 108. In this way, the locking bar elements 106 again extend into the openings 112 and the access door 44 is locked by the actuator 60 in the chopping position.

Having described the preferred embodiment, it will become apparent that various modifications can be made without departing from the scope of the invention as defined in the accompanying claims.

The invention claimed is:

1. In a combination of a forage harvester chopper arrangement and a grinding arrangement, wherein the chopper arrangement is mounted for rotation about a rotation axis located within a housing having an access door mounted for movement between a closed chopping position, wherein access to said chopper arrangement is prevented and wherein chopped crop is prevented from exiting said housing in a region including said door, and an open grinding position wherein said grinding arrangement may interact with said chopper arrangement, and an actuator coupled to said access door for selectively moving the door between said chopping and grinding positions, the improvement comprising: a locking arrangement operatively coupled to said access door and being mounted for movement, independent of any movement of said access door, between locked and unlocked positions for respectively selectively securing said access door in said chopping position, and permitting said access door to be moved to said chopping position.

2. The combination, as defined in claim 1, and further including a motion-transmitting linkage coupled between said actuator and said locking arrangement for permitting said actuator to selectively move said locking arrangement between said locked and unlocked positions.

3. The combination, as defined in claim 2, wherein said motion-transmitting linkage contains a lost-motion connection acting such that, upon said actuator being actuated for effecting movement of said access door from said chopping position to said grinding position, said locking arrangement is moved from said locked position to said unlocked position prior to any movement of said access door.

4. The combination, as defined in claim 2, wherein said linkage contains a second lost-motion connection acting such that, upon said actuator being actuated for effecting movement of said access door from said grinding position to said chopping position, said locking arrangement is moved from said unlocked position to said locked position only after said access door is in its chopping position.

5. The combination, as defined in claim 3, wherein said lost-motion connection is defined by an elongate hole provided in a first member and an element carried by a second member and received for movement in said elongate hole.

6. The combination, as defined in claim 1, wherein said locking arrangement includes at least one locking bar mounted to said access door for sliding movement; and an opening being provided for receiving said locking bar for establishing said locked position of said locking arrangement.

7. The combination, as defined in claim 2, wherein said motion-transmitting linkage includes a shaft mounted for pivoting about a second axis extending parallel to said rotation axis; said actuator being coupled for effecting oscillation of said shaft about said second axis; a first lever being fixed to said shaft and coupled to said access door; and at least a second lever being fixed to said shaft and coupled to said locking arrangement.

8. The combination, as defined in claim 7 wherein said door is mounted for pivoting about said second axis.

9. The combination, as defined in claim 1, wherein said actuator is a remotely operable electric motor; an electronic control arrangement being coupled to said motor; a position sensor being coupled for sensing a position of an output element of said motor and for sending a signal representing said position to said control arrangement, whereby said control arrangement acts to automatically de-energizing said motor once said access door arrives at said grinding position when being moved from said chopping position.

10. The combination, as defined in claim 2, wherein said access door is rectangular and covers an opening having first and second sides extending parallel to said rotation axis; said access door being mounted for pivoting about a second axis located at said first side of said opening for movement between said chopping position and said grinding position; said second side of said opening including a flange extending parallel to, and generally radially outward from said rotation axis; said locking arrangement including an opening provided in said flange and a locking bar reciprocably mounted to said access cover and being located in axial alignment with, and received within said opening when said access door is in said chopping position; and a shock absorbing element being mounted between said actuator and said locking bar for preventing damage to said actuator and/or locking bar in the event said locking bar is not aligned with said opening when said actuator is acting to move said locking bar to its locked position.

* * * * *